United States Patent [19]
McLellan

[11] Patent Number: 4,748,635
[45] Date of Patent: May 31, 1988

[54] APPARATUS AND METHOD FOR UNIFORM IONIZATION OF HIGH PRESSURE GASEOUS MEDIA

[76] Inventor: Edward J. McLellan, 422 Connie Ave., Los Alamos, N. Mex. 87544

[21] Appl. No.: 836,251

[22] Filed: Mar. 5, 1986

[51] Int. Cl.$^4$ .............................................. H01S 3/097
[52] U.S. Cl. ........................................ 372/87; 372/86; 372/69; 372/38
[58] Field of Search ...................... 372/87, 55, 38, 69, 372/81, 86

[56] References Cited

U.S. PATENT DOCUMENTS

| | | | |
|---|---|---|---|
| 3,943,465 | 3/1976 | Aisenberg et al. | 372/61 |
| 4,024,465 | 5/1977 | Farish et al. | 378/87 |
| 4,412,333 | 10/1983 | McLellan | 372/87 |
| 4,547,883 | 10/1985 | Cohn et al. | 378/87 |
| 4,601,039 | 7/1986 | Sze | 372/87 |

FOREIGN PATENT DOCUMENTS 0232474 12/1984 Japan ........................................ 372/87

Primary Examiner—Leon Scott, Jr.
Attorney, Agent, or Firm—Samuel M. Freund

[57] ABSTRACT

An apparatus and method for the deposition of uniform high-energy in a high pressure gaseous medium using an electrical discharge which is suitable for providing a population inversion therein with the consequent support of laser oscillation or amplification. The electric discharge is achieved without the use of a fast high-voltage, high current switch which must carry the entire discharge current, and requires lower discharge voltages than are normally used for such discharges. The high-energy, high-voltage discharge is initiated and controlled by a low-energy, high-voltage discharge which is in turn initiated and controlled by a yet lower energy preionization pulse which may derive from an electrical discharge or ionizing radiation. The simplicity of the present design permits the construction of rugged, reliable and inexpensive high-power gas lasers.

12 Claims, 2 Drawing Sheets

APPARATUS AND METHOD FOR UNIFORM IONIZATION OF HIGH PRESSURE GASEOUS MEDIA

BACKGROUND OF THE INVENTION

The present invention relates generally to uniform ionization of gaseous media useful in pulsed gas lasers, and more particularly to a three-electrode, high gain, high pressure $CO_2$ laser which allows the use of dc voltage across the gain medium, thereby eliminating the need for a costly and less reliable high-energy pulsed discharge system for its excitation.

Two journal articles describe double discharge $CO_2$ lasers using three electrodes.

1. In "Double Discharge Excitation for Atmospheric Pressure $CO_2$ Lasers" by Albert K. LaFlamme, Rev, Sci. Instr. 41, 1578 (1970), a modified, double discharge laser is discussed. A single trigger device controls both the preionization and the gain medium pumping discharges. Although the apparatus of the subject invention also has one voltage controlling switch, this switch does not carry the substantial main laser discharge current as is the situation for the LaFlamme switch. This results in a significant improvement in laser cost, reliability and pulse repetition rate over lasers which require high voltage, high current rapid switching devices.

2. In "A 300-J Multigigawatt $CO_2$ Laser" by Martin C. Richardson, A. J. Alcock, Kurt Leopold, and Peter Burtyn, IEEE J. Quantum Electron. 9, 236 (1973), a true double discharge laser is described. A first trigger device fires the preionization discharge, while a second such device prevents the main discharge until sufficient ionization has occurred in the region of the anode. Here, as in Ref. 1, one trigger unit is carrying the entire main discharge current. As described hereinabove, such devices are expensive, have a tendency to be unreliable, and have limited rates of repetition.

A single patent, U.S. Pat. No. 4,412,333, "Three-Electrode Low Pressure Discharge Apparatus and Method for Uniform Ionization of Gaseous Media" issued to Edward J. McLellan on Oct. 25, 1983, which is hereby incorporated by reference herein, teaches the use of rapid electric discharge preionization to initiate and control the main discharge in the gaseous medium. The apparatus described therein avoids the use of a high voltage switch to hold the high energy discharge back until sufficient ionization has occurred to permit the main discharge to occur without serious arcing. However, the highest pressure which this device was found to operate without arcing was about 80 torr with mixtures of $CO_2$, $N_2$, and He, thereby limiting the available energy output from such a device. The apparatus and method of McLellan's invention also operates at lower voltage applied to the main discharge than similar devices.

SUMMARY OF THE INVENTION

An object of the present invention is to provide an apparatus and method for uniformly ionizing gaseous media at significant gas pressures.

Another object of my invention is to provide an apparatus and method for increasing the efficiency of depositing electrical energy into gaseous media.

Yet another object of the instant invention is to provide a source of pulsed, uniform laser oscillation or amplification at high gas pressure, high repetition rates, high efficiency, lower charging voltages, and with greatly simplified electronics.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the apparatus includes a pair of rectangular electrodes including a metal cathode and a wire screen anode, the anode being spaced apart from, approximately coextensive with, and disposed in a substantially parallel manner to the cathode and forming a volume therebetween enclosed on two sides by the pair of rectangular electrodes into which the gaseous medium can freely travel, means for producing substantial uniform ionization of the gaseous medium in the volume, means for producing a low-energy electric discharge in the gaseous medium in the volume on a timescale which is rapid compared to that for depositing high electrical energy in the gaseous medium present in the volume, the low-energy discharge commencing substantially immediately after the production of the uniform ionization in the volume, whereby there is a rapid increase in the uniform ionization of the gaseous medium in the volume, and means for producing a high dc potential difference between the pair of electrodes which is below the breakdown limit of the gaseous medium before the substantial uniform ionization is produced in the gaseous medium by the substantial uniform ionization producing means, the means for producing the potential difference being capable of switchlessly delivering substantial energy to a high-energy electric discharge occurring between the pair of electrodes which is initiated and controlled solely by the substantial increase in the substantial uniform ionization of the gaseous medium and which deposits substantial energy in the gaseous medium. The low-energy electric discharge is controlled by the substantial uniform ionization produced in the gaseous medium in the volume and increases the amount of uniform ionization in the gaseous medium during a period which is short compared with that for the high-energy discharge, this latter discharge thereby occurring uniformly. Preferably, the means for producing the low-energy discharge in the volume includes a small capacitor the charge on which is automatically rapidly discharged into the volume when the breakdown voltage of the gaseous medium therein is lowered as a result of the substantial uniform ionization of the gaseous medium. It is preferred that one end of the small capacitor be placed in electrical contact with the cathode and the other end in electrical contact with a bus which is part of an array of impedance elements which includes a planar, close-packed array of two lead impedance elements parallel to, and approximately coextensive with, located apart from, and on the opposite side of the anode from the cathode, forming two sides of a second volume and having all of the electrical leads on the side of the array away from the anode connected to a common bus and all of the electrical leads on the opposite side formed into leads cut approximately to the same length and disposed substantially perpendicularly to and pointing toward the anode. It is also preferred that an inductor be placed in electrical contact with the cathode and the means for producing a high dc potential difference between the pair of electrodes, in between these two elements. According to the teachings of my invention, the means for producing substantial uniform ionization in the volume between the anode and the cathode could include electromagnetic radiation generators, particle beam generators and/or dc electric discharge apparatus.

In a further aspect of the present invention, in accordance with its objects and purposes, the method thereof includes the steps of filling the region between a pair of substantially flat, parallel spaced-apart electrodes with a gaseous medium, charging the pair of electrodes to a dc potential difference which is below the breakdown voltage of the gaseous medium yet high enough to form a high-energy pulsed discharge when sufficient ionization is caused to occur between the pair of spaced-apart electrodes, the high-energy pulsed discharge depositing substantial energy in the gaseous medium between the pair of spaced-apart charged electrodes, producing substantial uniform ionization in the region between the pair of spaced-apart electrodes, whereby gaseous breakdown from the dc potential difference between the pair of spaced-apart electrodes can begin to occur, and causing a uniform low-energy electric discharge to occur between the pair of space-apart electrodes on a timescale which is short when compared with that for producing a high-energy electric discharge therebetween, the uniform low-energy electric discharge being controlled by the substantial uniform ionization, whereby an increase in the substantial uniform ionization is caused to occur uniformly between the pair of spaced-apart electrodes such that the high-energy pulsed discharge occurs substantially uniformly and deposits substantial energy in the gaseous medium between the pair of spaced-apart electrodes thereby.

Advantages of the apparatus and method of the subject invention include the switchless deposition of uniform high-energy from an electrical discharge into a gaseous medium at high pressure at lower applied voltages than are traditionally required, thereby eliminating costly, slow and failure-prone high voltage switching devices, and the necessity for very high voltage dc power supplies. This will be of significant benefit to the gas laser industry.

BRIEF DESCRIPTION OF THE DRAWINGS

The accompanying drawings which are incorporated in and form a part of the specification, illustrate two embodiments of the present invention and, together with the description serve to explain the principles of the invention.

DETAILED DESCRIPTION OF THE PREFERRED EMBODIMENTS OF THE INVENTION

Figure 1:
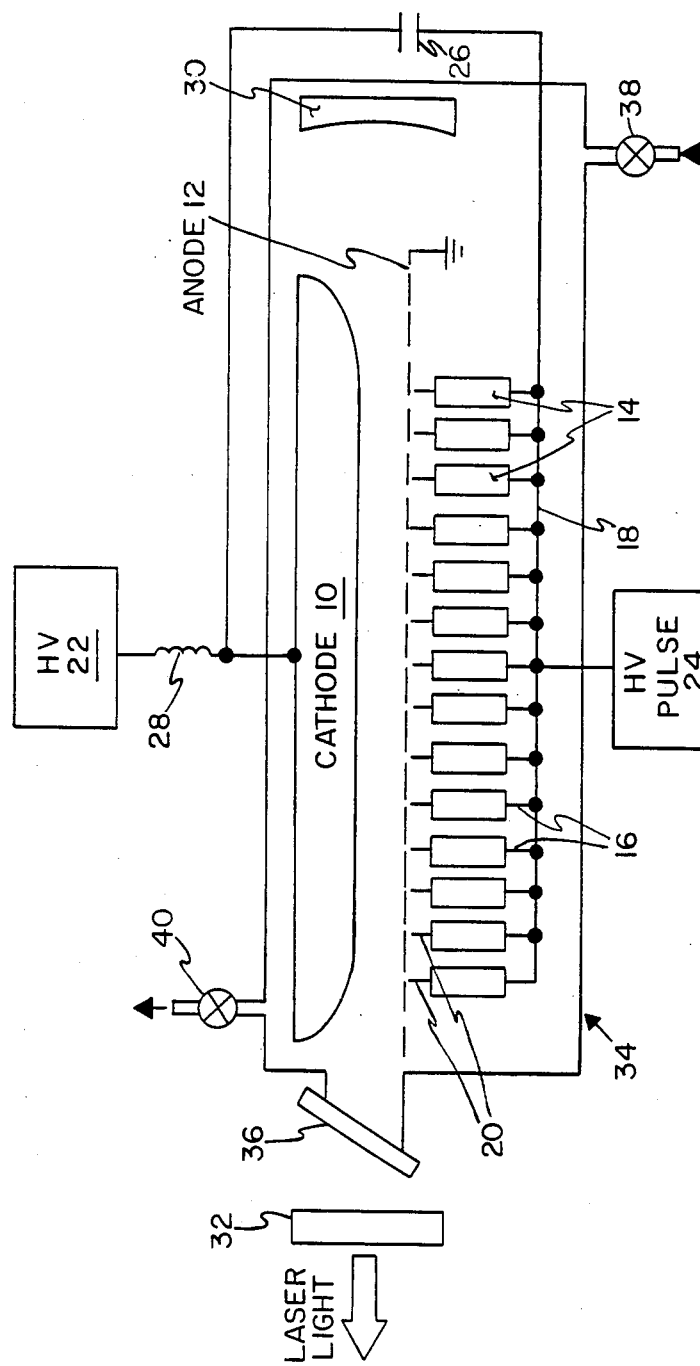
FIG. 1 is a schematic representation of one embodiment of the apparatus of the subject invention wherein substantial uniform ionization is generated between the anode and the cathode by means of a high voltage, low-energy electric discharge.

The subject invention includes an apparatus and method for the deposition of uniform high-energy in a high pressure gaseous medium using an electrical discharge which is suitable for providing a population inversion therein with the consequent support of laser oscillation or amplification. The discharge is achieved without the use of a high-voltage switch which must carry the entire discharge current, and requires lower electrode charging voltages than are normally utilized. The apparatus is similar to that described in the Mclellan patent described hereinabove, with two important differences. First, according to the teachings of my invention, a capacitor is placed between the bus and the cathode which allows a high voltage, low-energy electric discharge to commence between the cathode and the anode which increases the uniform ionization in the region between the anode and the cathode to where the high voltage, high-energy electric discharge can commence in a uniform manner, thereby depositing substantial energy in the gaseous medium. The high voltage, low-energy electric discharge is controlled by the substantial uniform ionization caused by the high voltage, low-energy trigger pulse which causes an electric discharge between the impedance elements and the wire screen anode, the substantial uniform ionization readily passing through the anode structure and entering the region between the anode and the cathode. This first ionization can also be generated by means other than electric discharge according to the teachings of my invention; for example, uv or x-ray electromagnetic radiation or electron of other particle beams admitted to the region between the anode and cathode could similarly provide substantial ionization in this region which could control the rapid high voltage, low-energy discharge which increases the uniform substantial ionization in the region of interest which initiates and controls the high voltage, high-energy discharge.

The use of lower main discharge voltages in the present invention is achieved without substantial arc formation due to the rapid increase in uniform ionization resulting from the high voltage, low-energy electric discharge. Ordinarily, it is necessary to "overvolt" the unionized gas in order to cause the rapid electron multiplication and other ionization producing processes to occur uniformly and rapidly enough to produce substantial energy deposition in the target gas by means of the high voltage, high-energy electric discharge without significant arc formation which always accompanies an "undervolted" gas discharge. An "undervolted" gas discharge is one occurring at high enouth voltage to break down the target gas, but too low an applied voltge to permit sufficient ionization to occur before arcing commences. Generally, it is also necessary to use shaped electrodes in order to establish a uniform electric field distribution in a two electrode discharge apparatus commonly employed in "overvolted" gas discharges. It is, however, possible to achieve a uniform discharge using a single ionization process and an "undervolted" target gas, according to the teachings of the McLellan patent, supra, but the apparatus and method described therein are useful only at low gas pressures. The extension of this technique to high gas pressures requires the use of an extremely rapid ionization step which accomplishes the processes which "overvolting"

and switching do without the use of a fast high voltage, high current switching device and higher applied voltages.

Reference will now be made in detail to the present preferred embodiments of the invention, examples of which are illustrated in the accompanying drawings.

FIG. 1 shows a schematic representation of one embodiment of the apparatus of the subject invention. A pair of electrodes comprising a cathode 10 and an anode 12 form two sides of a volume in which a gaseous medium to be ionized is located. The anode is a screen grid design such that gases may freely diffuse through its structure. Impedance elements 14 having one electrical lead 16 in electrical contact with a bus 18, and the other lead 20 unconnected and facing the anode, when charged by a pulsed, low-energy high voltage source 24 connected to the bus, provide substantial uniform ionization in the region between the anode and the cathode, since the electric discharge between the free leads 20 and the anode produces a uniform ionization in the region between the impedance elements and the anode, which ionization can diffuse through the open anode structure into the region between the anode and the cathode. Capacitor 26 placed in electrical contact with the bus 18 is charged by dc high voltage supply 22 through inductor 28 which protects the high voltage supply. The cathode is simultaneously charged by this supply to a voltage which is significantly below the breakdown threshold of the gaseous medium. A small amount of energy from the high voltage pulse source 24 is coupled through capacitor 26 and momentarily raises the voltage on cathode 10 which is isolated by inductor 28 above the breakdown threshold of the gaseous medium. This is done at essentially the same time as the uniform ionization is generated in the volume between the anode 12 and the resistive elements 14 producing thereby additional substantial uniform ionization in the region between the anode and the cathode on a timescale which is short compared with that necessary to deposit substantial energy in the region between the anode and cathode by a high voltage electrical discharge between these electrodes. The increased uniform substantial ionization in the region between the anode and cathode, again on a short timescale, thereby providing sufficient uniform ionization therebetween to cause the applied voltage from the high voltage power supply 22 to exceed the breakdown voltage of the uniformly substantially ionized gaseous medium and initiate and control a high voltage, high-energy electrical discharge to occur between the electrodes with substantial uniform energy deposition in the gaseous medium therebetween. Thus, a rapid, low-energy electrical discharge initiates and controls the uniform and reproducible deposition of high energy in a gas suitable for laser action. The electrode assembly is surrounded by gas-tight enclosure 34 having a gas inlet 38, a gas outlet 40, and at least one window suitable for passing laser radiation 36 in the event that the discharge apparatus of the present invention is used as a laser oscillator or amplifier. For the former application, one embodiment of my invention could utilize a total reflector 30 and a partial reflector 32 as part of an optical resonator. It will be apparent to those skilled in the laser art, after studying the teachings of the present disclosure, that many electrical circuit configurations can provide the dc high voltage and pulsed high voltage requirements for the practice of my invention.

Figure 2:
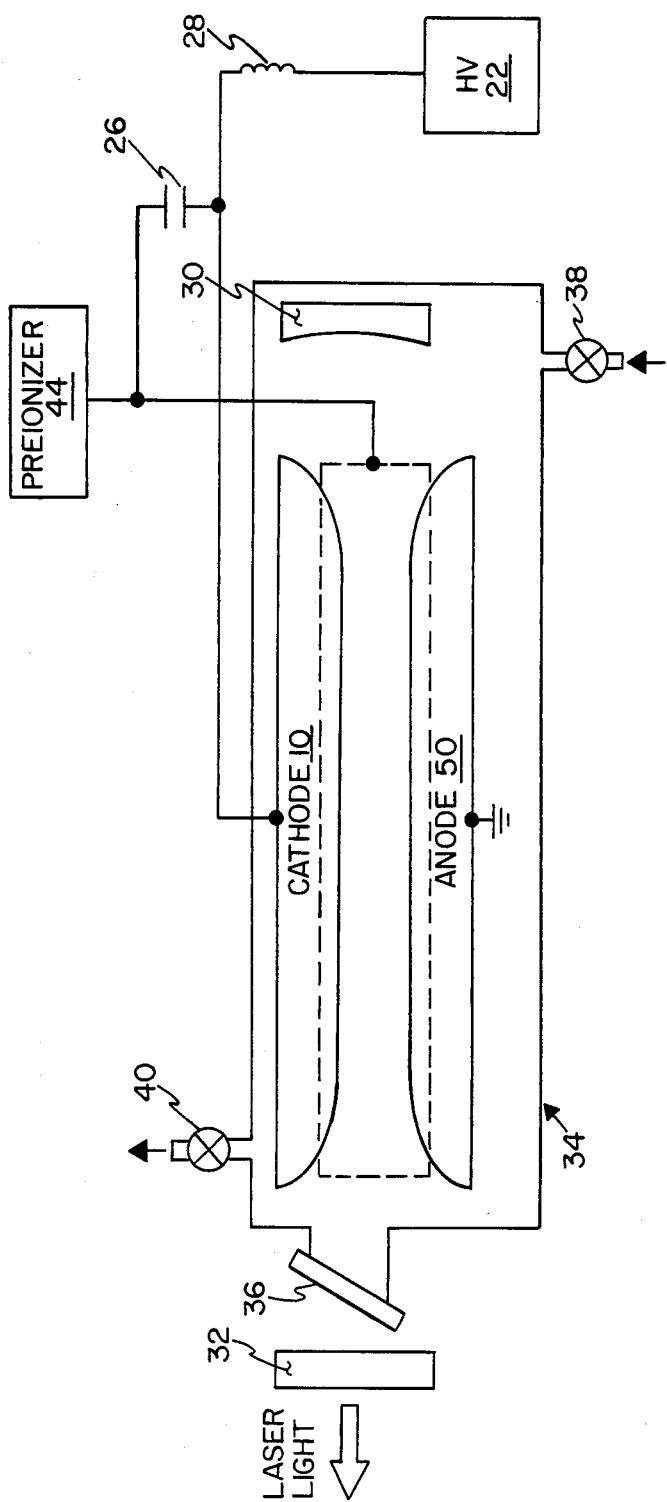
FIG. 2 is a schematic representation of another embodiment of the apparatus of the subject invention wherein the initial substantial uniform ionization between the anode and the cathode is generated by other than electrical discharge between a resistor array and a wire anode.

FIG. 2 shows a schematic representation of a second embodiment of the present invention. In this embodiment, the volume between the cathode 10 and the anode 50 is ionized using an ionization source 44 which might be an ultraviolet radiation or x-ray generator, an e-beam generator, or other particle accelerator. The ionization source 44 must, in addition to the function previously described, also generate a voltage increase on cathode 10 through capacitor 26 on a timescale short compared to that necessary to deposit substantial energy in the region between the anode and cathode by the main energy source 22. This voltage increase on the cathode will increase the potential across the medium to above breakdown threshold. The ionization produced thereby serves to initiate and control the rapid, low-energy electric discharge in this volume in substantially the same manner that the electric discharge apparatus shown in FIG. 1 hereinabove does. Again, the breakdown voltage of the gaseous medium in the region between the inductive elements and the anode is too high for the capacitor 26 charged by the high voltage power supply 22 to discharge until the ionization level is therein is made sufficiently great to lower the breakdown voltage of the gaseous medium in this region.

Having generally described the present invention, the following specific example is given as further illustration thereof.

EXAMPLE

Using a gas mixture comprising about 65% He, approximately 20% $CO_2$ and about 15% $N_2$ at between approximately 30 and 60 torr total gas pressure, a 140 cm long discharge comprised of eight about equal length cathodes spaced approximately 4 cm from a single anode produced between about 3 and 4 J of output energy per pulse out of a 37% reflecting output coupler. The applied voltage was varied from about 2.5 to 4 kV, capacitor 26 was 500 pF for each cathode, while inductor 28 was about 50 microHenries for each cathode. The output beam uniformity was approximately 90% over 90% of the 4 cm×4 cm beam area. The same apparatus was operated using a gas mixture having about 80% He, about 10% $CO_2$, and approximately 10% $N_2$ at total gas pressures up to between about 45 and 85 torr yielding a total gas pressure x electrode spacing product of between 180 and 340 torr-cm as compared to a maximum of 240 torr-cm obtainable with 95% He using the apparatus of the Mclellan patent, supra. Moreover, the apparatus of the present invention generated an essentially uniform plasma over a 1 cm×1 cm×30 cm volume when operated at pressures greater than 300 torr using a gas mixture having about 65% He, approximately 20% $CO_2$, and about 15% $N_2$. The electrode length was about 30 cm and the electrode spacing approximately 1 cm. Energies greater than 0.1 J/pulse were produced using an about 67% reflecting output coupler.

The foregoing description of two preferred embodiments of the subject invention has been presented for purposes of illustration and description. It is not intended to be exhaustive or to limit the invention to the precise form disclosed and obviously, many modifications and variations are possible in the light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. An apparatus for uniformly ionizing a high pressure gaseous medium and substantially uniformly depositing a substantial energy therein, which apparatus comprises in combination:
   a. a pair of rectangular electrodes including a metal cathode and a wire screen anode, said anode being spaced apart from, approximately coextensive with, and disposed in a substantially parallel manner to said cathode and forming a first volume therebetween enclosed on two sides by said pair of rectangular electrodes into which the gaseous medium can freely travel;
   b. a close-packed array of high impedence elements disposed in a planar configuration, said array being spaced apart from, approximately coextensive with, and located in a substantially parallel manner to said anode on the opposite side thereof from said cathode and with said anode forming a second volume therebetween into which the gaseous medium can freely travel, said second volume being enclosed on two sides by said anode and said array, each of said impedance elements in said array thereof including a first electrical lead and a second electrical lead, all of said first electrical leads being unconnected, approximately of equal length and disposed in a manner substantially perpendicular to said planar configuration and pointing toward and spaced apart from said anode, and all of said second leads being brought into electrical contact forming an electrical bus thereby, said bus being disposed on said array in a direction away from said anode;
   c. means for producing a low-energy, high voltage pulse between said bus and said anode, thereby forming a first electric discharge in the gaseous medium present in said second volume, said first electric discharge producing a uniform ionization of the gaseous medium in the second volume which extends into said first volume through said wire screen anode in a manner sufficient to produce substantial uniform ionization of the gaseous medium therein;
   d. means for producing a second low-energy, high voltage pulse between said cathode and said anode forming thereby a second electric discharge in the gaseous medium present in said first volume generating thereby additional uniform ionization in the first volume on a timescale which is rapid compared to that for depositing large amounts of electrical energy in the gaseous medium in said first volume, thereby forming substantial additional substantial uniform ionization in the gaseous medium present in said first volume, said second electric discharge commencing substantially immediately after said substantial uniform ionization in said second volume of the gaseous medium therein by said first electric discharge, said second electric discharge being initiated and controlled by said substantial uniform ionization in said second volume of the gaseous medium therein by said first discharge; and
   e. means for producing a high dc potential difference between said pair of electrodes, said potential difference being below the breakdown limit of the gaseous medium in said first volume before said second electric discharge causes said substantial increase in said substantial uniform ionization therein, said potential difference producing means being capable of delivering substantial energy to a third electric discharge, said third electric discharge occurring between said pair of electrodes and being initiated and controlled solely by said substantial increase in said substantial uniform ionization of the gaseous medium in said first volume, said third electric discharge depositing substantial energy in the gaseous medium.

2. The apparatus as described in claim 1, wherein said means for producing said low-energy, high voltage pulse between said pair of electrodes comprises a capacitor placed in electrical contact with both of said bus and said cathode.

3. The apparatus as described in claim 2, wherein said means for producing said low energy, high voltage pulse between said pair of electrodes further comprises an inductor inserted in the electrical path between said cathode and said means for producing a high dc potential difference between said electrodes.

4. A method for producing a uniform high energy discharge in a high pressure gaseous medium between a pair of spaced-apart, substantially parallel electrodes, said method comprising the steps of:
   a. filling the region between the pair of spaced-apart electrodes with a gaseous medium;
   b. charging the pair of spaced-apart electrodes to a dc potential difference which is below the breakdown voltage of the gaseous medium yet high enough to form a high energy pulsed discharge when sufficient ionization is caused to occur between the pair of spaced apart electrodes, said high energy pulsed discharge depositing substantial energy in the gaseous medium between the pair of spaced-apart charged electrodes;
   c. causing a first uniform low-energy pulsed discharge to occur outside of the region between the pair of spaced-apart electrodes, said first uniform low energy discharge producing ionization which enters the region between the pair of spaced-apart electrodes and causes uniform ionization therebetween, whereby gaseous breakdown from said dc potential difference between the pair of spaced-apart electrodes can occur; and
   d. permitting a second uniform low-energy electric discharge to occur between the spaced-apart pair of electrodes, said second uniform low-energy electric discharge being controlled by said first uniform low-energy pulsed discharge occurring outside of the region between the pair of spaced-apart electrodes and occurring on a timescale which is rapid compared to that for depositing substantial electrical energy between the spaced-apart electrodes, whereby sufficient ionization is caused to occur between the pair of spaced-apart electrodes that said high-energy pulsed discharge is caused to occur between the pair of spaced-apart electrodes, said high-energy pulsed discharge thereby occurring substantially uniformly and depositing substantial energy in the gaseous medium between the pair of spaced-apart electrodes.

5. In an apparatus for uniformly ionizing a high pressure gaseous medium and substantially uniformly depositing substantial energy therein, said apparatus comprising in combination:

a. a pair of rectangular electrodes including a metal cathode and a wire screen anode, said anode being spaced apart from, approximately coextensive with, and disposed in a substantially parallel manner to said cathode and forming a first volume therebetween enclosed on two sides by said pair of rectangular electrodes into which the gaseous medium can freely travel;

b. a close-packed array of high voltage impedance elements disposed in a planar configuration, said array being spaced-apart from, approximately coextensive with, and located in a substantially parallel manner to said anode on the opposite side thereof from said cathode and with said anode forming a second volume therebetween into which the gaseous medium can freely travel, said second volume being enclosed on two sides by said anode and said array, each of said impedance elements in said array thereof including a first electrical lead and a second electrical lead, all of said first electrical leads being unconnected, approximately of equal length and disposed in a manner substantially perpendicular to said planar configuration and pointing toward and spaced apart from said anode, and all of said second leads being brought into electrical contact forming an electrical bus thereby, said bus being disposed on said array in a direction away from said anode;

c. means for producing a low-energy, high voltage pulse between said bus and said anode thereby forming a first electric discharge in the gaseous medium present in said second volume, said first electric discharge producing a uniform ionization of the gaseous medium in said second volume which extends into said first volume through said anode in a manner sufficient to produce substantial uniform ionization of the gaseous medium therein;

d. means for producing a high dc potential difference between said pair of electrodes, said potential difference being below the breakdown limit of the gaseous medium in said first volume, said potential difference producing means being capable of delivering substantial energy to a third electric discharge occurring between said pair of electrodes, said third electric discharge depositing substantial energy in the gaseous medium; and e. a gas impermeable enclosure for containing and supporting said pair of electrodes, and said array of impedance elements, and containing the gaseous medium, the improvement therein comprising in combination:

means for producing a second low-energy, high voltage pulse between said cathode and said wire screen anode, thereby forming a second electric discharge in the gaseous medium present in said first volume on a timescale which is rapid compared to that for depositing high electrical energy in the gaseous medium in said first volume, said second electric discharge commencing substantially immediately after said substantially uniform ionization in said second volume of the gaseous medium therein by said first electric discharge, said second electric discharge being controlled by said substantial uniform ionization in said second volume of the gaseous medium therein by said first discharge, whereby a substantial increase in said uniform ionization of the gaseous medium occurs in said first volume, said substantial increase in said uniform ionization in said first volume occurring on a timescale which is rapid compared to that for depositing large amounts of electrical energy in the gaseous medium in said first volume, said third electric discharge being initiated and controlled solely by said increase in substantial uniform ionization of the gaseous medium in said first volume.

6. The apparatus as described in claim 5, wherein said means for producing said second low-energy, high voltage pulse between said cathode and said anode comprises a capacitor placed in electrical contact with both of said bus and said cathode.

7. The apparatus as described in claim 6, wherein said means for producing said second low-energy, high voltage pulse between said cathode and said anode further comprises an inductor inserted in the electrical path between said cathode and said means for producing a high dc potential difference between said electrodes.

8. An apparatus for uniformly ionizing a high pressure gaseous medium and substantially uniformly depositing a substantial energy therein, which apparatus comprises in combination:

a. a pair of rectangular electrodes including a metal cathode and a metal anode, said anode being spaced apart from, approximately coextensive with, and disposed in a substantially parallel manner to said cathode and forming a volume therebetween enclosed on two sides by said pair of rectangular electrodes into which the gaseous medium can freely travel;

b. means for producing substantial uniform ionization of the gaseous medium within said volume;

c. means for producing a low-energy, electric discharge in the gaseous medium immediately within said volume, said low-energy electric discharge commencing substantially immediately after said production of said substantial uniform ionization within said volume of the gaseous medium therein, said low-energy electric discharge being controlled by said substantial uniform ionization immediately within said volume of the gaseous medium, whereby a substantial increase in said substantial uniform ionization of the gaseous medium occurs within said volume generating substantial uniform ionization of the gaseous medium in said volume on a timescale which is rapid when compared to that for depositing high electrical energy in the gaseous medium in said volume; and d. means for producing a high dc potential difference between said pair of electrodes, said potential difference being below the breakdown limit of the gaseous medium in said volume before said substantial uniform ionization is produced therein, said potential difference producing means being capable of delivering substantial energy to a high-energy electric discharge occurring between said pair of electrodes, said high-energy electric discharge being initiated and controlled solely by said substantial uniform ionization of the gaseous medium in said volume, said high-energy electric discharge depositing substantial energy in the gaseous medium.

9. The apparatus as described in claim 8, wherein said means for producing said second low-energy, electric discharge within said volume comprises a capacitor placed in electrical contact with said cathode and said preionization generator source, and wherein said means for producing said substantial uniform ionization within said volume produces substantial ionization in said volume, said substantial ionization in said volume controlling said low-energy electric discharge, thereby producing said substantial increase in said substantial uniform ionization in said volume.

10. The apparatus as described in claim 9, wherein said means for producing said low-energy, electric discharge further comprises an inductor inserted in the electrical path between said cathode and said means for producing a high dc potential difference between said electrodes.

11. The apparatus as described in claim 10, wherein said means for producing substantial uniform ionization of the gaseous medium in said volume includes ionization means selected from the group consisting of high-energy electromagnetic radiation generators, particle beam generators, and electrostatic discharge generators.

12. A method for producing a uniform high energy discharge in a high pressure gaseous medium between a pair of spaced-apart, substantially parallel electrodes, said method comprising the steps of:

a. filling the region between the pair of spaced-apart electrodes with a gaseous medium;

b. charging the pair of spaced-apart electrodes to a dc potential difference which is below the breakdown voltage of the gaseous medium yet high enough to form a high-energy pulsed discharge when sufficient ionization is caused to occur between the pair of spaced-apart electrodes, said high-energy pulsed discharge depositing substantial energy in the gaseous medium between the pair of spaced-apart charged electrodes;

c. producing substantial uniform ionization in the region between the pair of spaced-apart electrodes, whereby gaseous breakdown from said dc potential difference between the pair of spaced-apart electrodes can begin to occur; and d. causing a uniform low-energy electric discharge to occur between the spaced-apart pair of electrodes on a timescale which is short compared with that for producing a high-energy electric discharge therebetween, said uniform low-energy electric discharge being controlled by said substantial uniform ionization, whereby an increase in said substantial uniform ionization is caused to occur between the pair of spaced-apart electrodes such that said high-energy pulsed discharge is caused to occur between the pair of spaced-apart electrodes, said high-energy pulsed discharge occurring substantially uniformly and depositing substantial energy in the gaseous medium between the pair of spaced-apart electrodes.

* * * * *